US011875610B2

(12) United States Patent
Kim

(10) Patent No.: US 11,875,610 B2
(45) Date of Patent: Jan. 16, 2024

(54) METHOD AND SYSTEM FOR MANAGING REMOTE SERVICE STANDBY TIME OF A CONNECTED CAR

(71) Applicants: HYUNDAI MOTOR COMPANY, Seoul (KR); KIA CORPORATION, Seoul (KR)

(72) Inventor: Hyang-Jin Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 323 days.

(21) Appl. No.: 17/307,655

(22) Filed: May 4, 2021

(65) Prior Publication Data

US 2022/0215694 A1    Jul. 7, 2022

(30) Foreign Application Priority Data

Jan. 5, 2021    (KR) .................. 10-2021-0000953

(51) Int. Cl.
*G07C 5/00* (2006.01)
*G06F 9/4401* (2018.01)
*G07C 5/08* (2006.01)
*H04W 4/44* (2018.01)
*H04W 52/02* (2009.01)

(52) U.S. Cl.
CPC ........... *G07C 5/008* (2013.01); *G06F 9/4416* (2013.01); *G07C 5/0816* (2013.01); *H04W 4/44* (2018.02); *H04W 52/0251* (2013.01)

(58) Field of Classification Search
CPC ........... G05B 2219/23316; G05B 2219/25279; G05B 2219/25286; G05B 2219/25289; G07C 5/008; G07C 5/0816; H04W 4/44; H04W 52/0251
See application file for complete search history.

(56) References Cited

U.S. PATENT DOCUMENTS 5,689,715 A * 11/1997 Crump .................. G06F 1/3209
                                                    713/502
7,912,518 B2 * 3/2011 Uh ..................... H04W 52/0251
                                                    455/574
(Continued)

FOREIGN PATENT DOCUMENTS

EP          2469898 A1 * 6/2012  ............ H04W 8/183
KR        20190082950 A    7/2019

*Primary Examiner* — Redhwan K Mawari
(74) *Attorney, Agent, or Firm* — LEMPIA SUMMERFIELD KATZ LLC

(57) ABSTRACT

A method for managing a remote service standby time of a connected car includes: notifying, by a connected car service (CCS) center which provides a remote service on a connected car, a customer terminal that a remote service standby mode needs to be ended; setting the remote service standby mode through a CCS application installed in the customer terminal; checking, by a CCS terminal installed in the connected car, whether a time to start the end of the remote service standby mode in accordance of the setting of the remote service standby mode has come; and, when the time to start the end of the remote service standby mode has come, requesting, by the CCS terminal, a shut-down of a modem installed in the connected car, and can efficiently manage the remote service standby time of the connected car.

13 Claims, 5 Drawing Sheets

(56) References Cited

U.S. PATENT DOCUMENTS

| | | | |
|---|---|---|---|
| 8,837,340 B2* | 9/2014 | Kwon | H04W 76/28 |
| | | | 370/312 |
| 10,678,416 B2* | 6/2020 | Fadell | G01R 31/26 |
| 2015/0171659 A1* | 6/2015 | Lee | H02J 50/10 |
| | | | 320/108 |
| 2017/0120813 A1* | 5/2017 | Wilson | G08B 21/24 |
| 2018/0148048 A1* | 5/2018 | Kim | B60W 30/09 |
| 2018/0335825 A1* | 11/2018 | Kim | H04W 52/0235 |
| 2019/0256106 A1* | 8/2019 | Lee | B60W 50/14 |
| 2020/0209883 A1* | 7/2020 | Kim | G07C 5/008 |
| 2020/0369238 A1 | 11/2020 | Toyooka et al. | |

\* cited by examiner

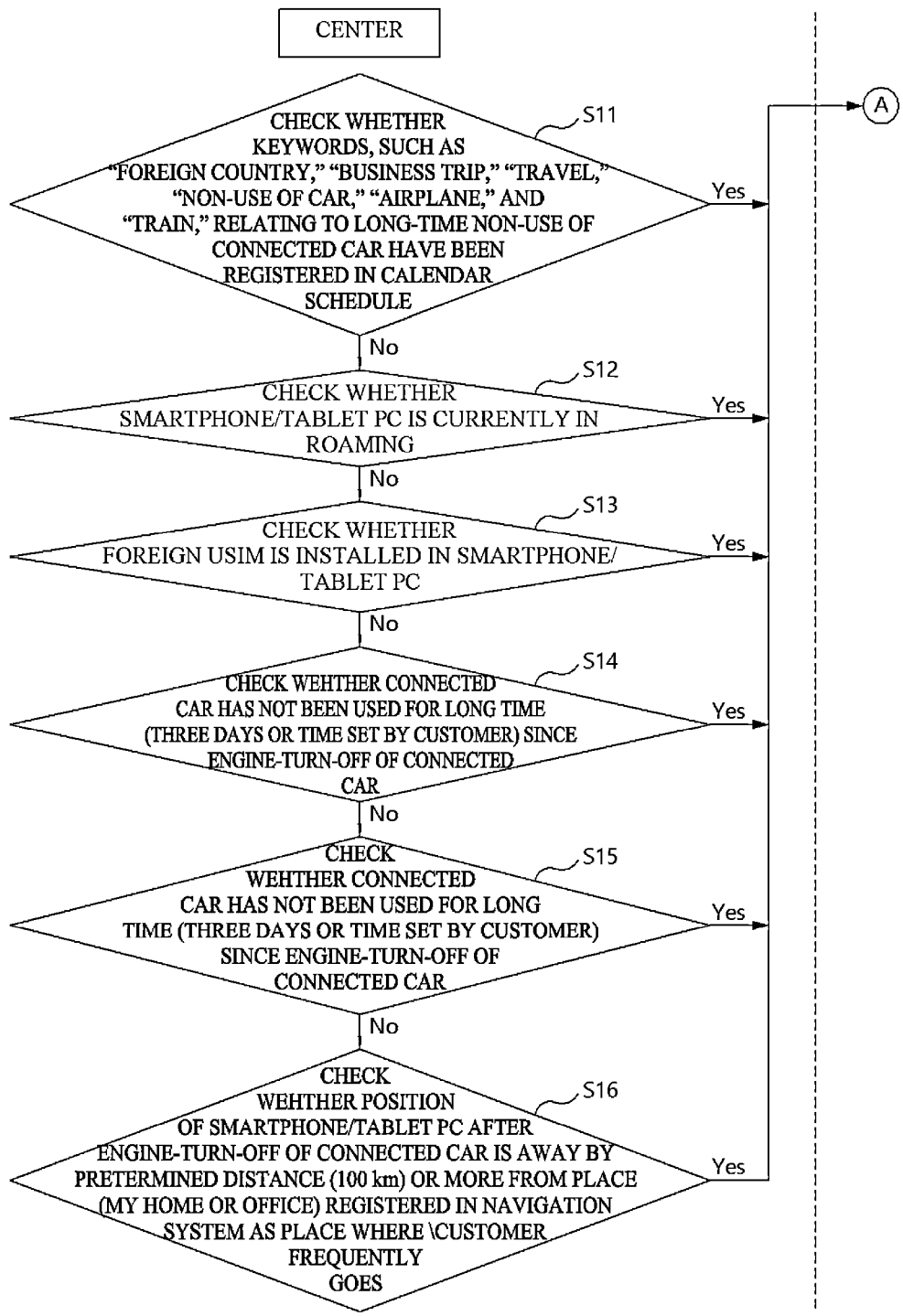

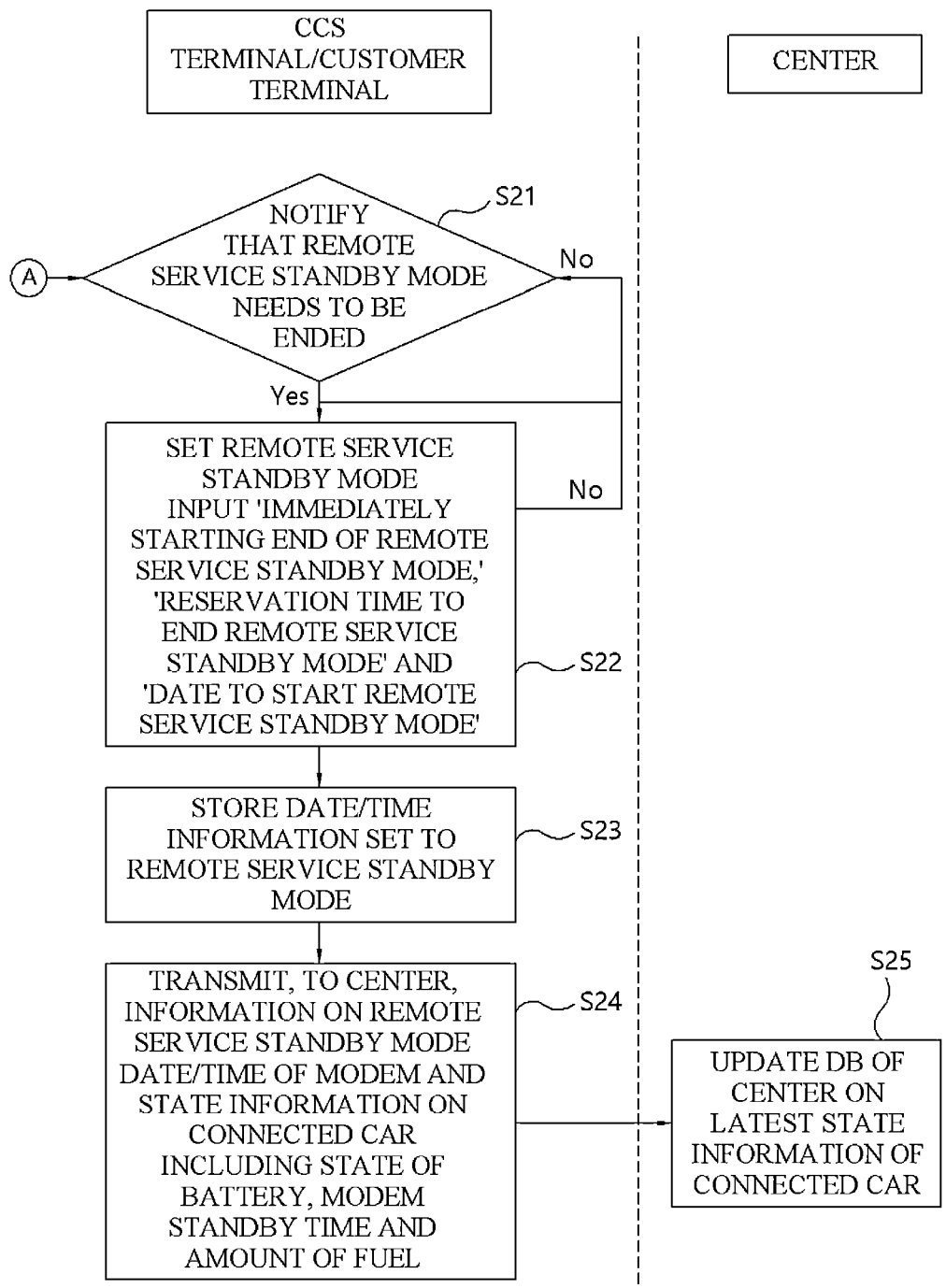

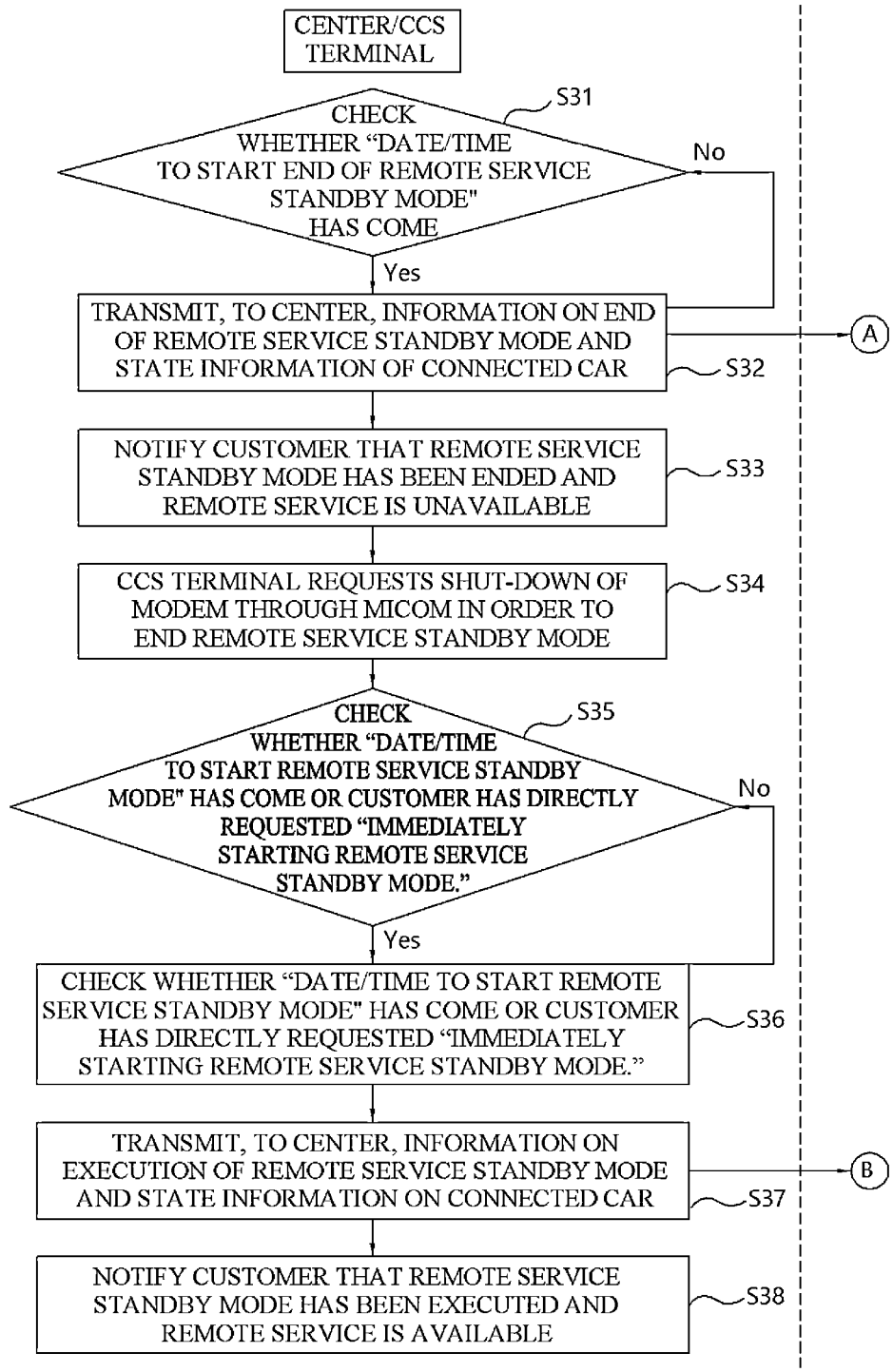

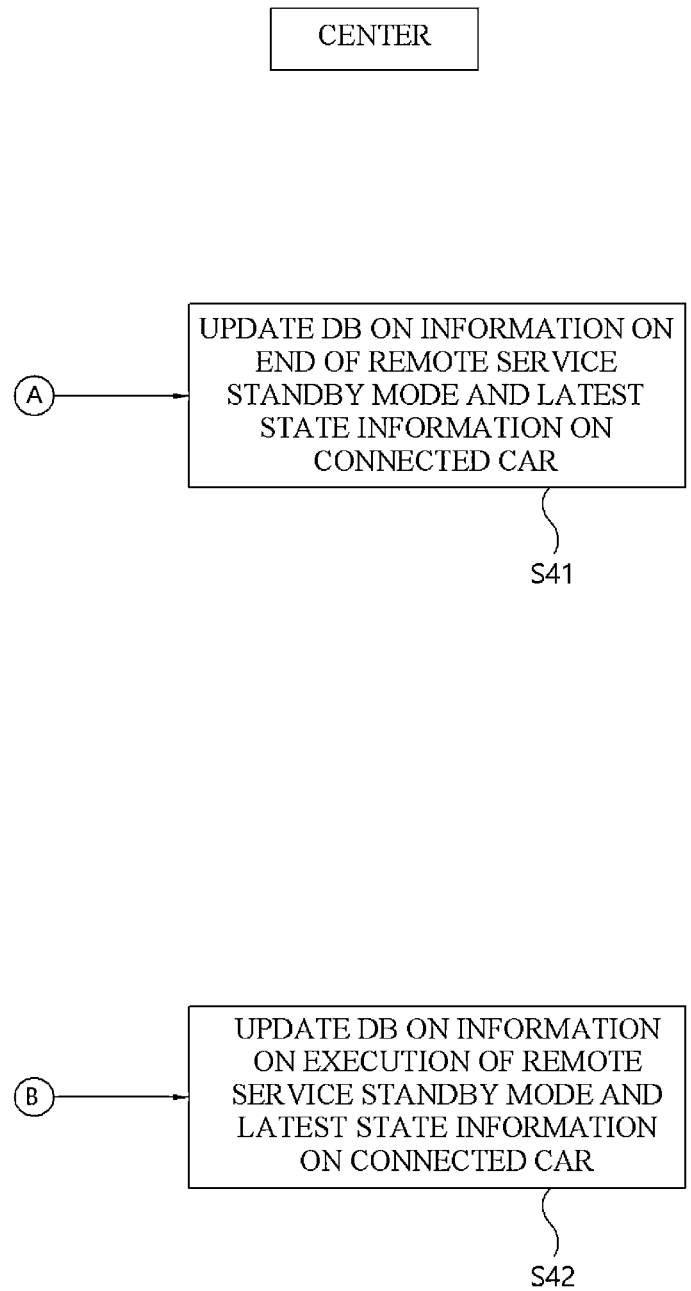

METHOD AND SYSTEM FOR MANAGING REMOTE SERVICE STANDBY TIME OF A CONNECTED CAR

CROSS-REFERENCE TO RELATED APPLICATION

This application claims priority to Korean Patent Application No. 10-2021-0000953, filed on Jan. 5, 2021, which is incorporated herein by reference in its entirety.

BACKGROUND OF THE DISCLOSURE

Field of the Disclosure

The present disclosure relates to a connected car service, and more particularly, to a method and system for managing a remote service standby time of a connected car.

Description of Related Art

A connected car refers to a car that is connected to information communication technology and that can provide Internet services, mobile services, and the like. The outside may be remotely and wirelessly connected to the connected car to start or turn off an engine thereof or to execute a heater or navigation system thereof and may access a communication network to provide an electronic mail, multimedia streaming, social network services, and the like.

To this end, the connected car is connected to a customer terminal such as a smartphone or a connected car service server through a communication network by using a modem installed therein.

However, for a remote service, the modem needs to always operate in a standby mode, thereby resulting in concerns about a dead battery.

When a customer ends the standby mode of the modem, the customer cannot use the remote service. When the customer is suddenly absent for a long time without ending the standby mode of the modem, the customer cannot prevent the dead battery. In other words, the customer has limitations in directly managing the modem.

The contents described in the Description of Related Art section are to help understand the background of the present disclosure. Thus, the section may include matters other than the prior arts which have already known to those having ordinary skill in the art to which the present disclosure pertains.

SUMMARY OF THE DISCLOSURE

The present disclosure has been contrived to solve the above-described problems. An object of the present disclosure is to provide a method and system capable of efficiently managing a remote service standby time of a connected car.

In one aspect, the present disclosure provides a method for managing a remote service standby time of a connected car. The method comprises steps of: setting a remote service standby mode on a connected car service (CCS) terminal installed in a connected car; checking, by the CCS terminal, whether a time to start the end of the remote service standby mode in accordance with the setting of the remote service standby mode has come; when the time to start the end of the remote service standby mode has come, requesting, by the CCS terminal, a shut-down of a modem installed in the connected car.

The method may further include the steps of: a remote service standby time of the connected car is ended by the step of requesting the shut-down of the modem; checking whether a time to start the remote service standby mode in accordance with the setting of the remote service standby mode has come; and when the time to start the remote service standby mode has come, requesting, by the CCS terminal, a wake-up of the modem.

The method may further include the steps of: storing, by the CCS terminal, information on the setting of the remote service standby mode, which is made in the step of setting the remote service standby mode; transmitting, by the CCS terminal, information on a remote service standby mode time of the modem and state information on the connected car to a CCS center, which provides a remote service to the connected car; and, when the time to start the end of the remote service standby mode has come, transmitting, by the CCS terminal, information on the end of the remote service standby mode and latest state information on the connected car to the CCS center.

The method may further include a step of before the step of requesting, by the CCS terminal, the shut-down of the modem after the step of transmitting, by the CCS terminal, the information on the end of the remote service standby mode and the latest state information on the connected car to the CCS center, transmitting, by the CCS terminal, the information on the end of the remote service standby mode to a customer terminal, the customer terminal being a terminal of a customer who uses the connected car.

The method may further include the steps of: transmitting, by the CCS terminal, information on the execution of the remote service standby mode for the connected car by the step of requesting the wake-up of the modem and the latest state information on the connected car to the CCS center; and after the step of transmitting the information on the execution of the remote service standby mode and the latest state information on the connected car, transmitting, by the CCS terminal, the information on the execution of the remote service standby mode to the customer terminal.

Another aspect of the present disclosure provides a method for managing a remote service standby time of a connected car, the method comprising steps of: notifying, by a connected car service (CCS) center which provides a remote service to a connected car, a customer terminal that a remote service standby mode needs to be ended, the customer terminal being a terminal of a customer who uses the connected car; and, when the remote service standby mode is set through a CCS application installed in the customer terminal, transmitting, by the CCS center, information on the setting of the remote service standby mode to a CCS terminal installed in the connected car.

The method may further include a step of receiving, by the CCS center, information on a change in the remote service standby mode in accordance with the setting of the remote service standby mode, from the CCS terminal.

The method may further include a step of checking whether information has been registered, the information being stored in a database (DB) of the CCS center and being used for inferring that the connected car has not been used for a long time. When the check result indicates that the information has been registered which is used for inferring that the connected car has not been used for a long time, the step of notifying the customer terminal that the remote service standby mode needs to be ended is performed.

The method may further include a step of checking, by the CCS center, whether the customer terminal is in roaming. When the check result indicates that the customer terminal is in roaming, the step of notifying the customer terminal that the remote service standby mode needs to be ended is performed.

The method may further include a step of checking, by the CCS center, whether a universal subscriber identify module (USIM) of the customer terminal has been changed to a foreign USIM. When the check result indicates that the USIM of the customer terminal has been changed to the foreign USIM, the step of notifying the customer terminal that the remote service standby mode needs to be ended is performed.

The method may further include a step of checking, by the CCS center, whether the connected car has not been used for a long time since the engine-turn-off of the connected car, through the CCS terminal. When the check result indicates that the connected car has not been used for a long time since the engine-turn-off of the connected car, the step of notifying the customer terminal that the remote service standby mode needs to be ended is performed.

The method may further include a step of checking, by the CCS center, whether a distance between the connected car and the customer terminal after the engine-turn-off of the connected car is a predetermined distance or more, through the CCS terminal and the customer terminal. When the check result indicates that the distance between the connected car and the customer terminal is the predetermined distance or more, the step of notifying the customer terminal that the remote service standby mode needs to be ended is performed.

The method may further include a step of checking, by the CCS center, whether a position of the customer terminal after the engine-turn-off of the connected car is away by a predetermined distance or more from a specific place set by the customer, through the CCS terminal and the customer terminal. When the check result indicates that the position of the customer terminal is away by the predetermined distance or more from the specific place, the step of notifying the customer terminal that the remote service standby mode needs to be ended is performed.

Still another aspect of the present disclosure provides a system for managing a remote service standby time of a connected car. The system comprises: a connected car having a connected car service (CCS) terminal installed therein; a CCS center configured to provide a remote service to the connected car; and a customer terminal having a CCS application which is installed therein and interworks with the CCS center, the terminal being a terminal of a customer who uses the connected car. The CCS center notifies the customer terminal that a remote service standby mode needs to be ended. When a time to start the end of the remote service standby mode in accordance with the setting of the remote service standby mode has come, the setting being inputted through the CCS application, the CCS terminal requests a shut-down of a modem installed in the connected car.

In the system, when a time to start the remote service standby mode in accordance with the setting of the remote service standby mode has come since the end of a remote service standby time of the connected car by the shut-down of the modem, the CCS terminal may request a wake-up of the modem.

In the system, when the time to start the end of the remote service standby mode has come, the CCS terminal may transmit, to the customer terminal, information on the end of the remote service standby mode. When a time to start the remote service standby mode has come, the CCS terminal may transmit, to the customer terminal, information on the execution of the remote service standby mode.

In the system, the CCS center may check whether information has been registered, the information being stored in a database (DB) of the CCS center and used for inferring that the connected car has not been used for a long time. When the check result indicates that the information has been registered which is used for inferring that the connected car has not been used for a long time, the CCS center may notify the customer terminal that the remote service standby mode needs to be ended.

In the system, the CCS center may check whether the customer terminal is in roaming. When the check result indicates that the customer terminal is in roaming, the CCS center may notify the customer terminal that the remote service standby mode needs to be ended.

In the system, the CCS center may check whether the connected car has not been used for a long time since the engine-turn-off of the connected car, through the CCS terminal. When the check result indicates that the connected car has not been used for a long time since the engine-turn-off of the connected car, the CCS center may notify the customer terminal that the remote service standby mode needs to be ended.

In the system, the CCS center may check, through the CCS terminal and the customer terminal, whether a position of the customer terminal after the engine-turn-off of the connected car is away by a predetermined distance or more from a specific place set by the customer. When the check result indicates that the position of the customer terminal is away by the predetermined distance or more from the specific place, the CCS center may notify the customer terminal that the remote service standby mode needs to be ended.

The method and system for managing a remote service standby time of a connected car can allow a customer to dividedly use a standby time of a modem at a desired time so as to efficiently use limited battery resources for a connected car, thereby increasing usability and easily managing a connected car.

BRIEF DESCRIPTION OF THE DRAWINGS

FIG. 2A, FIG. 2B, FIG. 3A, and FIG. 3B are flowcharts of a method for managing a remote service standby time of a connected car in accordance with the present disclosure.

DESCRIPTION OF SPECIFIC EMBODIMENTS

Figure 1:
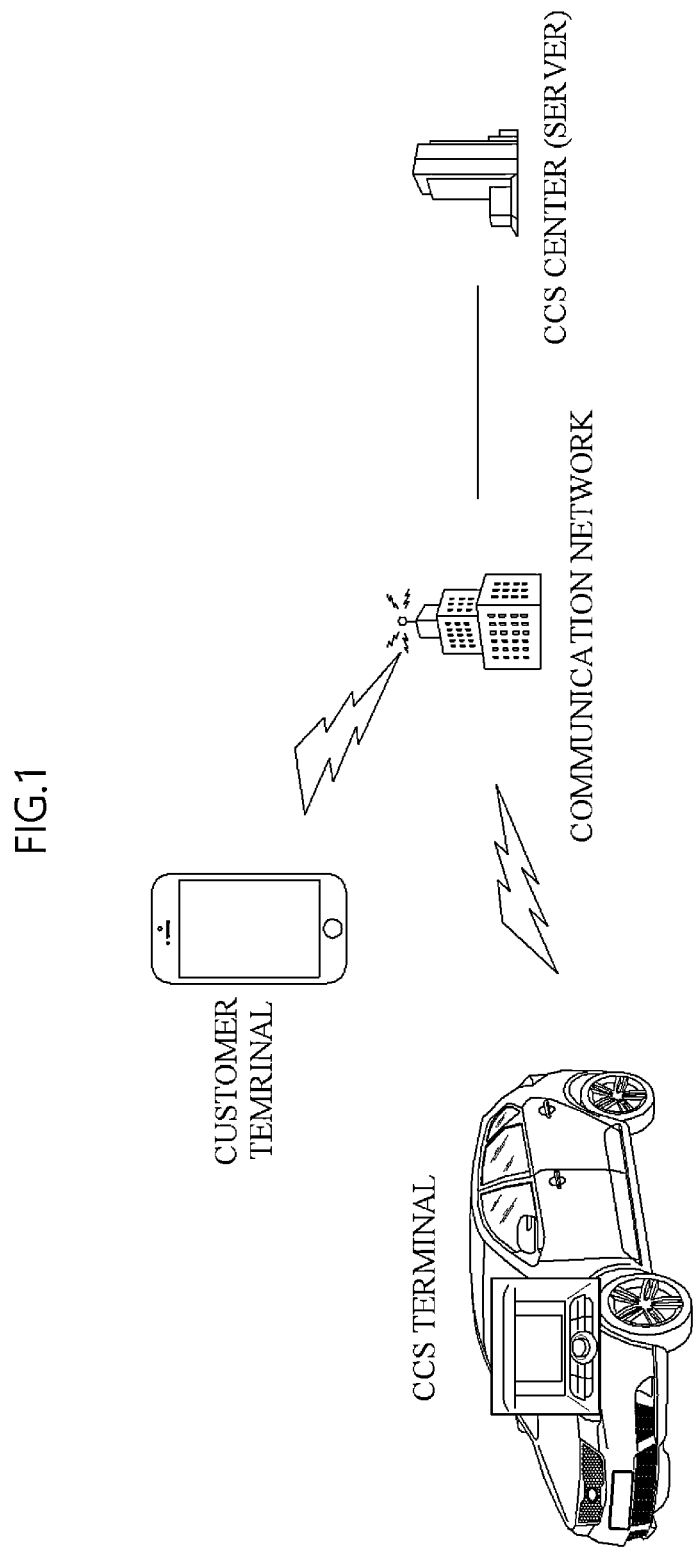
FIG. 1 is a view schematically illustrating a system for managing a remote service standby time of a connected car in accordance with the present disclosure.

The present disclosure, the operational advantages of the present disclosure, and an object achieved by carrying out the present disclosure should be sufficiently understood with reference to the accompanying drawings illustrating an embodiment of the present disclosure and the contents illustrated in the accompanying drawings.

In describing the embodiment of the present disclosure, the description of publicly-known technology or repetitive description which may unnecessarily obscure the subject matter of the present disclosure has been shortened or omitted.

FIG. 1 is a view schematically illustrating a system for managing a remote service standby time of a connected car in accordance with the present disclosure. FIG. 2A, FIG. 2B, FIG. 3A, and FIG. 3B are flowcharts illustrating a method for managing a remote service standby time of a connected car in accordance with the present disclosure.

Hereinafter, a method and system for managing a remote service standby time of a connected car in accordance with an embodiment of the present disclosure is described with reference to FIGS. 1-3B.

The present disclosure relates to a method and system for managing a remote service standby time of a modem of a connected car which has a connected car service (CCS) terminal installed therein and which is connectable to a communication network.

The CCS terminal includes a CCS controller and a modem and is connected to a CCS center (server), which provides the CCS, through a communication network by using the modem, and controls the connected car by using the CCS controller.

When set to a remote service standby mode, the modem may perform a connected function under control of the CCS center. The present disclosure provides a method and system for managing such a remote service standby time.

The CCS center includes a server and a database (DB). A specific program, such as a CCS application, for performing a CCS management function is loaded into a customer terminal. The customer terminal may be a personal computer (PC), smartphone, or tablet PC, which may communicate with the CCS center through the communication network.

First, the CCS center checks information as to whether the connected car has not been used for a long time (S11). The CCS center checks the information through the DB stored in the CCS center. The CCS center receives the latest state information on the connected car from the connected car, stores the received information in the DB, and updates the DB.

With an interface through the CCS application, a customer may input information on the customer's schedule or the connected car through his/her terminal. The inputted information may be transmitted to the CCS center and stored in the DB.

Therefore, checking the information as to whether the connected car has not been used for a long time is to check whether information has been registered, the information being stored in the DB of the CCS center, for example, recorded in a calendar schedule, and being used for inferring that the connected car has not been used for a long time. The information used for inferring that the connected car has not been used for a long time may include keywords such as 'foreign country,' 'business trip,' 'travel,' 'non-use of car,' 'airplane' and 'train.'

Then, the CCS center checks whether the customer terminal is in roaming (S12).

In other words, the CCS center checks whether the customer terminal is currently in roaming, through the information transmitted by the customer terminal.

The CCS center checks whether a universal subscriber identify module (USIM) of the customer terminal has been changed to a foreign USIM (S13). In other words, the CCS center checks whether the foreign USIM is currently installed in the customer terminal, through the information transmitted by the customer terminal. The check results in steps S12 and S13 indicate that the customer is not likely to use the connected car for a long time because he/she is currently abroad.

The CCS center checks whether the connected car has not been used for a long time (S14). This is to check whether the connected car has not been used for a long time since the engine-turn-off of the connected car (OFF), through the state information on the connected car. The period during which the connected car has not been used may be, for example, three days or more, which may be set directly by the customer through the CCS application.

The CCS center checks a distance between the connected car and the customer terminal (S15). This is to check whether the position/distance between the connected car and the customer terminal is a predetermined distance or more since the engine-turn-off of the connected car, through the state information on the connected car and the information on the customer terminal. The predetermined distance may be set to 100 km, for example.

The CCS center checks a position of the customer terminal (S16). This is to check, through the state information on the connected car and the information on the customer terminal, whether the position/distance of the customer terminal after the engine-turn-off of the connected car is away by a predetermined distance or more from a specific place, such as a place registered, in a navigation system of the connected car, as a place where the customer frequently goes. Examples of the specific place may include 'my home,' 'office,' and the like, and the predetermined distance may be set to 100 km, for example.

The checks in steps S11-S16 correspond to the check procedures for inferring whether the connected car has not been used for a long time. When the check results of steps S11-S16 indicate that the connected car has not been used for a long time, the CCS center notifies the customer terminal that the remote service standby mode needs to be ended (S21). Steps S11-S16 have been sequentially described for convenience of explanation. However, the order of the steps is not limited thereto, and when one of steps S11-S16 is satisfied, step S21 is performed.

A message for notifying that the remote service standby mode needs to be ended may be, for example, "Would you end the remote service standby mode?"

Then, when the customer wants to end the remote service standby mode according to the notification of step S21 (YES), the customer may set the remote service standby mode through the CCS application (S22). The remote service standby mode may be set to 'immediate starting the end of the remote service standby mode,' and may be set by the customer's inputting 'a reservation time to end the remote service standby mode' or 'a time to start the remote service standby mode.' When the customer does not want to end the remote service standby mode, the remote service standby mode is maintained.

According to the setting in step S22, the customer terminal and the CCS terminal each store the information on the setting of the remote service standby mode (reservation time or start time) (S23). The CCS terminal transmits, to the CCS center, the state information on the connected car including the information on remote service standby mode time of the modem, the state of battery, the modem standby time, and the amount of fuel (S24). The CCS center updates the DB on the latest state information on the connected car (S25).

Thereafter, the CCS terminal checks whether a time to start the end of the remote service standby mode has come (S31). In other words, the CCS terminal checks whether the previously set time to start the end of the remote service standby mode has come. When the check result indicates that the time has come, the CCS terminal ends the remote service standby mode and transmits the state information on the connected car to the CCS center (S32). The CCS center updates the DB on the end of the remote service standby mode and the latest state information on the connected car (S41).

Then, the CCS center notifies the customer terminal that the remote service standby mode has been ended and the remote service is unavailable (S33).

Then, the CCS terminal requests a shut-down of the modem (S34). In other words, the CCS terminal requests the shut-down of the modem through the controller (microcomputer) in order to end the remote service standby mode. Therefore, the remote service standby time of the modem is ended, and the remote service becomes unavailable.

After the end of the remote service standby time as described above, the CCS terminal checks whether a time to start the remote service standby mode has come (S35). This is to check whether the previously set time to start the remote service standby mode has come and to check a request such as 'immediately starting the remote service standby mode' which may be directly made by the customer through the CCS application.

When the check result indicates that the time to start the remote service standby mode has come, the CCS terminal requests a wake-up of the modem (S36). In other words, in order to execute the remote service standby mode, the CCS terminal requests the wake-up of the modem through the controller (microcomputer). Therefore, the remote service standby time of the modem is started, and the remote service becomes available.

Next, the CCS terminal transmits, to the CCS center, information on the execution of the remote service standby mode and the state information on the connected car (S37). The CCS center updates the DB on the information on the execution of the remote service standby mode and the state information on the connected car (S42).

Then, the CCS center notifies the customer terminal that the remote service standby mode has been executed and the remote service is available (S38).

As described above, the present disclosure may manage the remote service standby time so that the remote service standby mode is ended and restarted through the setting by the user when it is inferred that the connected car has not been used for a long time. The battery of the connected car is thereby protected and user convenience is thereby provided.

As described above, although the present disclosure has been described with reference to the drawings, the present disclosure is not limited the embodiment described above. It should be apparent to the person having ordinary skill in the art that the present disclosure can be variously changed and modified without departing from the technical spirit and scope of the present disclosure. Accordingly, it should be construed that such changed examples or modified examples fall under the claims of the present disclosure, and the scope of the rights of the present disclosure should be interpreted on the basis of the appended claims.

What is claimed is:

1. A method for managing a remote service stand by time of a connected car, the method comprising steps of:
    notifying, by a connected car service (CCS) center which provides a remote service to a connected car, a customer terminal that a remote service standby mode needs to be ended, the customer terminal being a terminal of a customer who uses the connected car;
    when the remote service standby mode is set through a CCS application installed in the customer terminal, transmitting, by the CCS center, information on the setting of the remote service standby mode to a CCS terminal installed in the connected car;
    determining a necessity of the end of the remote service standby mode by the CCS center, regardless of a setting of the end of the remote service standby mode through the CCS application,
    checking, by the CCS center, through the CCS terminal and the customer terminal, a position of the customer terminal after an engine-turn-off of the connected car,
    determining, by the CCS center, that the end of the remote service standby mode is needed when that the position of the customer terminal is away by a predetermined distance or more from a specific place set by the customer, and
    when the position of the customer terminal is away by the predetermined distance or more from the specific place, notifying, by the CCS center, the customer terminal that the remote service standby mode needs to be ended.

2. The method of claim 1, further comprising a step of:
    receiving, by the CCS center, information on a change in the remote service standby mode in accordance with the setting of the remote service standby mode, from the CCS terminal.

3. The method of claim 1, wherein determining the necessity of the end of the remote service standby mode comprises:
    checking information being stored in a database (DB) of the CCS center and being used for inferring that the connected car has not been used for a predetermined time; and
    determining that the end of the remote service standby mode is needed when the information is used for inferring that the connected car has not been used for the predetermined time,
    wherein, when the information is used for inferring that the connected car has not been used for the predetermined time, performing the step of notifying the customer terminal that the remote service standby mode needs to be ended.

4. The method of claim 1, wherein determining the necessity of the end of the remote service standby mode comprises:
    checking, by the CCS center, a roaming status of the customer terminal; and
    determining that the end of the remote service standby mode is needed when the customer terminal is in roaming,
    wherein, when the customer terminal is in roaming, performing the step of notifying the customer terminal that the remote service standby mode needs to be ended.

5. The method of claim 1, wherein determining the necessity of the end of the remote service standby mode comprises:
    checking, by the CCS center, a change of a universal subscriber identify module (USIM) of the customer terminal to a foreign USIM; and
    determining that the end of the remote service standby mode is needed when the USIM of the customer terminal has been changed to the foreign USIM,
    wherein, when the USIM of the customer terminal has been changed to the foreign USIM, performing the step of notifying the customer terminal that the remote service standby mode needs to be ended.

6. The method of claim 1 wherein determining the necessity of the end of the remote service standby mode comprises:

checking, by the CCS center, an unused period of the connected car since an engine-turn-off of the connected car, through the CCS terminal; and determining that the end of the remote service standby mode is needed when the unused period of time of the connected car exceeds a predetermined time since the engine-turn-off of the connected car, wherein, when the unused period of time of the connected car exceeds the predetermined time since the engine-turn-off of the connected car, performing the step of notifying the customer terminal that the remote service standby mode needs to be ended.

7. The method of claim 1, wherein determining the necessity of the end of the remote service standby mode comprises:

checking, by the CCS center, a distance between the connected car and the customer terminal after an engine-turn-off of the connected car, through the CCS terminal and the customer terminal; and determining that the end of the remote service standby mode is needed when the distance between the connected car and the customer terminal is a predetermined distance or more, wherein, when the distance between the connected car and the customer terminal is the predetermined distance or more, performing the step of notifying the customer terminal that the remote service standby mode needs to be ended.

8. The method of claim 1, wherein determining the necessity of the end of the remote service standby mode comprises:

checking, by the CCS center, a position of the customer terminal after an engine-turn-off of the connected car, through the CCS terminal and the customer terminal; and determining that the end of the remote service standby mode is needed when the position of the customer terminal is away by a predetermined distance or more from a specific place set by the customer, wherein, when the position of the customer terminal is away by the predetermined distance or more from the specific place, performing the step of notifying the customer terminal that the remote service standby mode needs to be ended.

9. A system for managing a remote service standby time of a connected car, the system comprising:

a connected car having a connected car service (CCS) terminal installed therein;

a CCS center configured to provide a remote service to the connected car; and a customer terminal having a CCS application which is installed therein and interworks with the CCS center, the customer terminal being a terminal of a customer that uses the connected car, wherein the CCS center notifies the customer terminal that a remote service standby mode needs to be ended, wherein, when a time has come to proceed to end the remote service standby mode in accordance with a setting of a remote service standby mode, the setting being input through the CCS application, the CCS terminal requests a shut-down of a modem installed in the connected car, wherein, when a time has come to start the remote service standby mode in accordance with the setting of the remote service standby mode since an end of a remote service standby time of the connected car by the shut-down of the modem, the CCS terminal requests awake-up of the modem, wherein the CCS center determines a necessity of the end of the remote service standby mode, regardless of a setting of the end of the remote service standby mode through the CCS application, wherein the CCS center checks, through the CCS terminal and the customer terminal, a position of the customer terminal after an engine-turn-off of the connected car, wherein the CCS center determines that the end of the remote service standby mode is needed when that the position of the customer terminal is away by a predetermined distance or more from a specific place set by the customer, and wherein, when the position of the customer terminal is away by the predetermined distance or more from the specific place, the CCS center notifies the customer terminal that the remote service standby mode needs to be ended.

10. The system of claim 9, wherein when the time has come to proceed to end the remote service standby mode, the CCS terminal transmits, to the customer terminal, information on the end of the remote service standby mode, and when the time has come to start the remote service standby mode, the CCS terminal transmits, to the customer terminal, information on execution of the remote service standby mode.

11. The system of claim 9, wherein the CCS center checks information being stored in a database (DB) of the CCS center and used for inferring that the connected car has not been used for a predetermined time or more, the CCS center determines that the end of the remote service standby mode is needed when the information is used for inferring that the connected car has not been used for the predetermined time or more, and when the information is used for inferring that the connected car has not been used for the predetermined time or more, the CCS center notifies the customer terminal that the remote service standby mode needs to be ended.

12. The system of claim 9, wherein the CCS center checks a roaming status of the customer terminal, the CCS center determines that the end of the remote service standby mode is needed when the customer terminal is in roaming, and when the customer terminal is in roaming, the CCS center notifies the customer terminal that the remote service standby mode needs to be ended.

13. The system of claim 9, wherein the CCS center checks an unused period of time of the connected car since an engine-turn-off of the connected car, through the CCS terminal, the CCS center determines that the end of the remote service standby mode is needed when the unused period of time of the connected car exceeds a predetermined time since the engine-turn-off of the connected car, and when the unused period of time of the connected car exceeds the predetermined time since the engine-turn-off of the connected car, the CCS center notifies the customer terminal that the remote service standby mode needs to be ended.

* * * * *